United States Patent Office 3,437,310
Patented Apr. 8, 1969

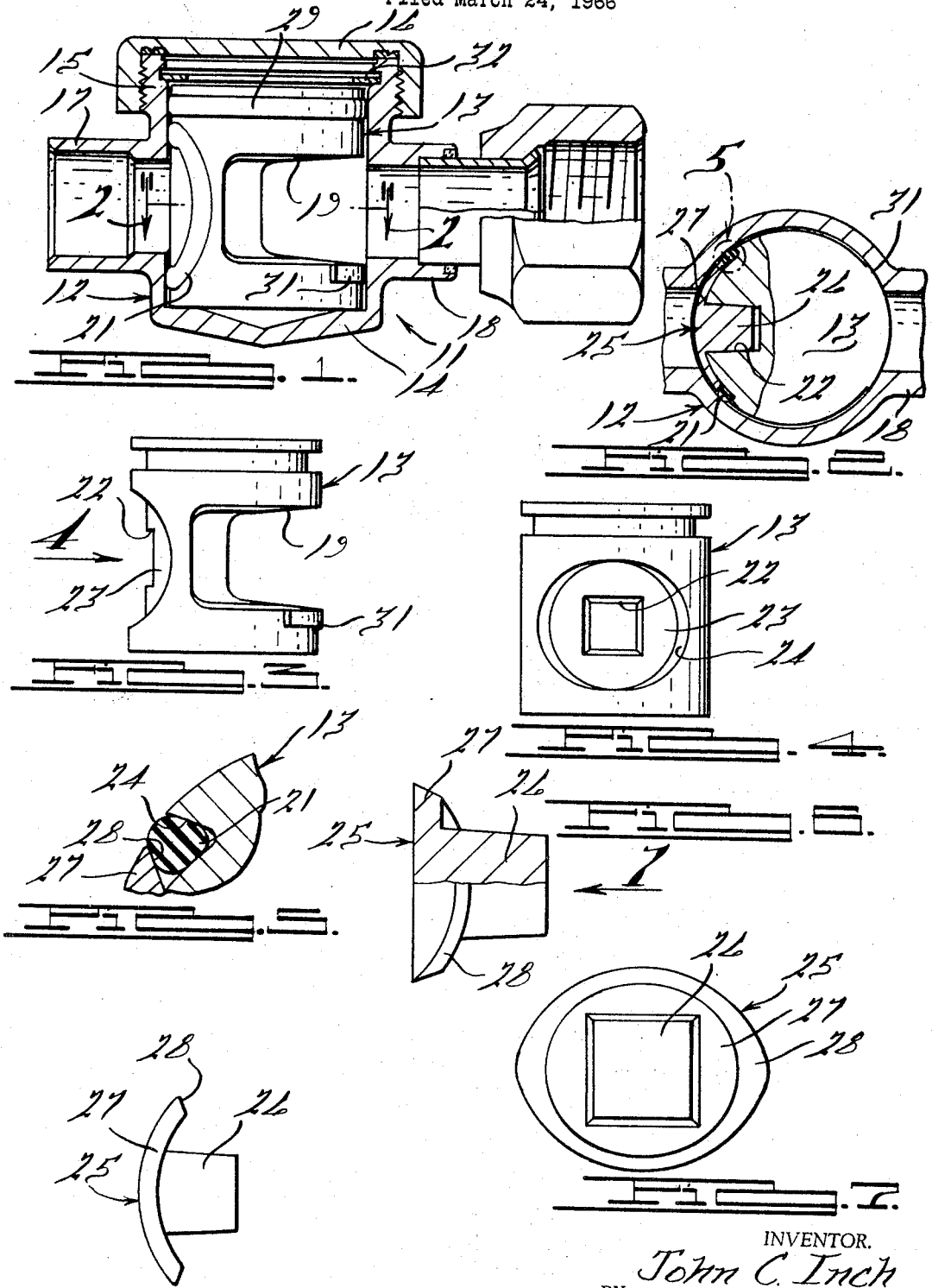

3,437,310
O-RING RETAINING CONSTRUCTION FOR ROTARY VALVES
John C. Inch, Marysville, Mich., assignor to Mueller Brass Co., Port Huron, Mich., a corporation of Michigan
Filed Mar. 24, 1966, Ser. No. 537,099
Int. Cl. F16k 5/04
U.S. Cl. 251—317   2 Claims

ABSTRACT OF THE DISCLOSURE

A rotary valve carrying an O-ring seal retained by a one-piece plug, the head of the plug fitting in a recess in the stem which conforms to the cylindrical shape of the stem, the seal being retained by reentrant surfaces on the facing edges of the plug head and the stem recess.

---

This invention relates to rotary valves, and more particularly to an O-ring retaining construction for such valves.

It is an object of the invention to provide a novel and improved means for retaining skewed O-rings on the cylindrical faces of rotary valve stems, which means is economical and inexpensive to construct, while still retaining the O-ring in a reliable manner and preventing its dislodgment due to pressure differentials.

It is another object to provide an improved stem construction for rotary valves having skewed O-rings which will maintain the axial alignment of the rotary valve when moved to its different positions, while substantially reducing the cost of such guide means.

The manner of accomplishing the foregoing objects and other objects and features of this invention will become apparent from the following description of embodiments of the invention when read with reference to the accompanying drawings, in which:

FIGURE 1 is a cross-sectional view in elevation of a rotary valve incorporating the principles of the construction of the invention;

FIGURE 2 is a plan cross-sectional view of the stem and its associated parts taken along the line 2—2 of FIGURE 1;

FIGURE 3 is a side elevational view of the stem with the retaining plug and O-ring removed;

FIGURE 4 is an end elevational view of the stem taken in the direction of the arrow 4 of FIGURE 3, and showing the configuration of the plug receiving portion of the stem;

FIGURE 5 is an enlarged fragmentary sectional view taken in the area marked 5 of FIGURE 2 and showing the inclination of the O-ring retaining walls on the stem and plug;

FIGURE 6 is a side elevational view, parts being sectioned, of the plug;

FIGURE 7 is an end elevational view of the plug taken in the direction of the arrow 7 of FIGURE 6; and FIGURE 8 is a top elevational view of the plug.

Briefly, the illustrated embodiment of the invention comprises a valve body with a cylindrical stem receiving cavity and aligned inlet and outlet ports leading to and from the cavity through the cylindrical body wall. The valve stem has a cylindrical shape with a deep recess in one side thereof, so that in one rotary position of the stem the ports will be connected. The cylindrical portion of the stem wall is provided with another recess, this one being of non-circular cross-sectional shape, and with a wider and shallower recess surrounding it. This wider recess is round and has a side wall of reentrant shape.

A plug is provided, this plug having a mounting section of noncircular cross-sectional shape, complementary to the noncircular stem recess. The plug also has a retaining head which fits in the wider stem recess and conforms to the curvature of the cylindrical stem surface. The outer edge of this head, which is round, has a slope which is opposite to the slope of the reentrant side wall mentioned above. When the plug is mounted in the stem, a space will be provided between the two sloping side walls within which an O-ring can be retained. The O-ring will thus be of skewed shape, and will surround the inlet port when the stem is properly rotated, engaging the body wall so as to close the valve.

The stem has clearance with respect to the body, and to maintain proper alignment, a circular O-ring is mounted on the upper end of the stem, engaging the body cavity above the inlet and outlet ports. A raised segmental strip is provided on the stem below the level of the inlet and outlet ports, this segmental portion being diametrically opposite the inlet sealing O-ring and having a sliding fit with the body bore. This raised portion of the stem will eliminate the need for a second O-ring below the inlet and outlet ports to maintain axial alignment of the stem.

Referring more particularly to the drawings, the rotary valve is generally indicated at 11 and comprises a body generally indicated at 12 and a stem generally indicated at 13. The body 12 is of generally cylindrical shape with a closed bottom 14 and an open top which is externally threaded at 15 and carries a removable cover 16.

An inlet port 17 and an outlet port 18 extend in opposite directions from the cylindrical surface of body 12, as seen in FIGURES 1 and 2. These ports are aligned so as to be connectable when stem 13 is rotated to a predetermined angular position.

Stem 13 is of generally cylindrical shape and has a deep recess 19 on one side thereof, this recess being aligned with ports 17 and 18 when the stem is in one angular position. Means (not shown) such as a tool receiving recess may be provided in the top of stem 13 for rotating it when cover 16 is removed.

An O-ring 21 is carried by stem 13 and surrounds the connection of port 17 with the body cavity when the stem is in the position of FIGURES 1 and 2. The means for retaining O-ring 21 in position comprises a recess 22 in the side of stem 13 opposite that having recess 19. Recess 22 is best seen in FIGURES 2 and 4, and is of noncircular cross-sectional shape, a square shape being shown in the drawings. The recess is slightly tapered toward its inner end, and its average cross-sectional size is substantially smaller than that of port 17.

The outer end of recess 22 terminates in a wider and shallower recess 23. This recess surrounds the outer end of recess 22 and follows the cylindrical configuration of the stem surface. The side wall 24 of recess 23 is undercut as seen in FIGURE 5, this reentrant shape of the side wall extending around its entire length. The size of recess 23 is such that side wall 24 thereof will surround the connection of port 17 with the body cavity when the stem is in the position of FIGURES 1 and 2.

A plug generally indicated at 25 is provided for retaining O-ring 21 in position within cavity 23. This plug has a mounting portion 26 with a cross-sectional shape complementary to that of recess 22, so that when this part of the plug is inserted in the recess it will be jammed therein. The plug also has a head 27 with a shape complementary to that of recess 23, except for the side wall 28 thereof. In other words, head 27 is of arcuate shape, conforming to the shape of the cylindrical surface of stem 13, and will fill recess 23 when portion 26 of the plug is inserted in recess 22, except that side wall 28 of the plug will be spaced from side wall 24 of the recess.

Side wall 28 slopes in a direction opposite to that of side wall 24, as seen in FIGURE 5. The two side walls will thus engage O-ring 21 in a manner retaining it in the space between the side walls. The O-ring will be held in a skewed position, projecting somewhat from the surface of stem 13 so as to engage the body cavity, as seen in FIGURES 1 and 2. The pressure differentials exerted upon O-ring 21 which might cause it to be removed from its retaining slot when it passes port 17 will thus be counteracted, properly retaining the O-ring in position at all times.

Stem 13 is also provided with a seal in the form of an O-ring 29 which surrounds the stem above the location of ports 17 and 18 and engages the bore cavity, as seen in FIGURE 1. The stem itself has a loose fit with respect to the bore cavity, and the lower end of the stem is provided with a raised segmental portion 31 as seen in FIGURES 1, 2 and 3. Portion 31 is opposite the location of O-ring 21 and is engageable with the body cavity at about the same level as the lower end of O-ring 21, as seen in FIGURE 1. Segment 31 will thus help to maintain stem 13 in alignment with the body cavity, eliminating the need for a second O-ring at the lower end of the stem similar to O-ring 29. Axial movement of the stem will be limited by its engagement with the lower end 14 of the body and by means of a retaining ring 32 mounted in the body above the upper end of the stem.

It will thus be seen that a simple and yet effective means has been provided for retaining a skewed O-ring in position on a rotary valve stem, requiring only two basic parts and with a minimum amount of machining involved. By conventional machining methods, it would be quite difficult to create the reentrant cavity formed by side walls 24 and 28 on the cylindrical surface of the stem, especially in view of the skewed nature of such a cavity. The present assembly will of course be facilitated by the non-circular shape of recess 22, since this will fix the angular orientation of plug 25 so as to coact properly with the adjacent portions of the stem.

While the illustrated embodiment of the invention shows the O-ring 29 as surrounding the inlet port in the closed position of the valve, the O-ring could be used to surround the outlet port in the closed position since the reentrant nature of the retaining groove will prevent dislodgment of the O-ring, regardless of the directions of the pressure differentials.

While it will be apparent that the embodiment of the invention herein disclosed is well calculated to fulfill the objects of the invention, it will be appreciated that the invention is susceptible to modification, variation and change without departing from the proper scope or fair meaning of the subjoined claims.

I claim:

1. In a rotary valve, a body having a cylindrical cavity, a loosely fitting cylindrical stem rotatably mounted in said cavity, inlet and outlet ports on said body, a recessed portion on said stem connecting said ports when said stem is rotated to an open position, a noncircular inwardly tapered plug receiving recess in said stem spaced angularly from said first-mentioned recess, a wider and shallower recess in said cylindrical stem surface surrounding said plug receiving recess, said shallower recess following the cylindrical contour of said stem surface throughout its entire extent, a plug having a mounting portion with a cross-sectional shape complementary to that of said plug receiving recess, and a head portion receivable by said shallower recess when said mounting portion is inserted in said plug receiving recess, said plug head being curved to fit in said shallower recess, the outer surface of said plug head having the same radius of curvature as the stem surface, oppositely sloping side walls on said shallower recess and plug head portion respectively, said side walls being spaced from each other around their entire length so that they together form a reentrant groove, an O-ring seal disposed within said groove and held in position by said sloping side walls, said O-ring seal being engageable with the body cavity and surrounding the connection of said inlet port with said body cavity when the stem is rotated to a closed position, a circular O-ring surrounding said stem on one side of said ports and engageable with the body cavity, and a raised segmental portion on said stem below said ports and engageable with the body cavity, said raised segmental portion being opposite the location of said plug and O-ring, whereby said last-mentioned O-ring and raised segmental portion will cooperate to maintain alignment of the stem in the body cavity, the surface of said stem below said ports being uninterrupted except for said raised segmental portion.

2. The combination according to claim 1, further provided with a circular O-ring surrounding said stem on one side of said ports and engageable with the body cavity, and a raised segmental portion on said stem below said ports and engageable with the body cavity, said raised segmental portion being opposite the location of said plug, whereby said last-mentioned O-ring and raised segmental portion will cooperate to maintain alignment of the stem in the body cavity.

References Cited

UNITED STATES PATENTS

| 2,433,732 | 12/1947 | Brown | 251—309 X |
| 3,254,872 | 6/1966 | Roos | 251—309 X |
| 3,314,643 | 4/1967 | Sachnik | 251—317 X |
| 3,314,645 | 4/1967 | Temple | 251—317 |

FOREIGN PATENTS

| 1,082,550 | 12/1954 | France. |
| 1,111,699 | 3/1956 | France. |
| 1,290,317 | 12/1962 | France. |
| 529,825 | 3/1954 | Italy. |

M. CARY NELSON, *Primary Examiner.*

M. O. STURM, *Assistant Examiner.*